United States Patent [19]
Even

[11] Patent Number: 5,680,622
[45] Date of Patent: Oct. 21, 1997

[54] SYSTEM AND METHODS FOR QUICKLY DETECTING SHAREABILITY OF SYMBOL AND TYPE INFORMATION IN HEADER FILES

[75] Inventor: Lindsay Wayne Even, Campbell, Calif.

[73] Assignee: Borland International, Inc., Scotts Valley, Calif.

[21] Appl. No.: 269,399

[22] Filed: Jun. 30, 1994

[51] Int. Cl.$^6$ ................................................. G06F 9/45
[52] U.S. Cl. ................. 395/709; 364/280.4; 364/708.1; 364/973; 375/240
[58] Field of Search ..................... 395/650, 700, 395/706, 708, 709; 364/973, 280.4, 708.1; 375/240

[56] References Cited

U.S. PATENT DOCUMENTS

| | | | |
|---|---|---|---|
| 4,931,928 | 6/1990 | Greenfeld | 364/300 |
| 5,058,144 | 10/1991 | Fiala et al. | 375/122 |
| 5,060,155 | 10/1991 | van Zuijlen | 364/419 |

OTHER PUBLICATIONS

Pyster, A. "Compiler Design and Construction", 1980, pp. 11, 15 and 16.
Horowitz et al, "Fundamentals of Computer Algorithms", 1978, pp. 82–93.
Sedgewick, R., Algorithms in C, Addison–Wesley, 1990, pp. 35–49, and 231–234.
Holub, A., *Top–Down Parsing using Recursive Descent*, C Gazette, 5:3, Spring 1991, pp. 33–45.

*Primary Examiner*—Kevin A. Kriess
*Assistant Examiner*—Michael T. Richey
*Attorney, Agent, or Firm*—John A. Smart; David N. Slone

[57] ABSTRACT

A development system having a compiler, a linker, and an interface is described. The compiler, which generates or "compiles" source listings into object modules, includes a parser for parsing information. Parsed information, which is initially stored in a parse tree, is further processed. A hash table is initialized for storing a unique address or signature for a particular data object (or set) of the tree. The nodes of the parse tree are processed in a "preorder" traversal. If a node under examination is not stored in the hash table, it is installed in the table and its address (hash address) is returned for storage in the tree. Other nodes of the tree are (recursively) processed in a similar manner. Two identical trees encountered in a parse will hash to the same address and thus need only be stored once. If two trees differ by only a small amount, only the difference and the left edge of the second tree will be stored in addition to the first. In this manner, the compiler may efficiently store parse trees that have duplicated nodes, such as those produced when a text file is included more than once in a program. The memory storage required is dramatically decreased because the approach eliminates storage of redundant information.

5 Claims, 8 Drawing Sheets

EXPRESSION:     A * B + C

PARSE TREE:

SIMPLE
PARSE TREE
270

```
struct tree  ~300
{
    char *name;
    tree *l, *r;
} trees[4096];
int ntrees = 0;  ~310
```

*FIG. 3A*

```
const int HASH_SIZE = 1999;   // Should be prime
struct hash_table  ~320
{
    char *str;
    int l, r;
    int visits;
} ht[HASH_SIZE];
int num_hashed = 0;  ~325
```

*FIG. 3B*

```
int
hash( char *str, int l = 0, int r = 0 )
{
    int h = 1;
    char *s = str;
331 ── while( *s )    // multiply bytes into h
        h *= *s++;
    h += l + r;    // add the other arguments
    if( h < 0 )    // worry about negatives
        h = -h;
    if( h <= 0 )   // and the two numbers
        h = 1;     // which have no negative.
    h %= HASH_SIZE;
333 ── while( ht[h].str )
    {
        if( ht[h].l == l && ht[h].r == r &&
            ! strcmp(ht[h].str,str) )
335 ──      return h;
337 ──  h = (h * h + 5) % HASH_SIZE;
    }
    if( num_hashed++ >= HASH_SIZE-1 )
        return 0;
    ht[h].str = new char[ strlen(str)+1 ];
339 ── strcpy( ht[h].str, str );
    ht[h].l = l;
    ht[h].r = r;
    return h; ── 340
}
```

*FIG. 3C*

```
         int
         store_tree( tree *t )
         {
             if( t == 0 )
               return 0;
351 ⌇    int l = store_tree( t->l );
353 ⌇    int r = store_tree( t->r );
355 ⌇    return hash( t->name, l, r );
         }
```

FIG. 3D

SYSTEM AND METHODS FOR QUICKLY DETECTING SHAREABILITY OF SYMBOL AND TYPE INFORMATION IN HEADER FILES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computing and, more particularly, to systems and methods for parsing information, such as source listings for computer programs.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. Most of the high-level languages currently used for program development exploit the concept of modularity whereby a commonly required set of operations can be encapsulated in a separately named subroutine, procedure, or function; these terms will be used interchangeably herein to represent any type of discrete code objects. Once coded, such subroutines can be reused by "calling" them from any point in the main program. Further, a subroutine may call a subsubroutine, and so on, so that in most cases an executing program is seldom a linear sequence of instructions.

In the C language, for example, a main() function is written which calls a sequence of functions, each of which can call itself (recursion) or other functions, and so on. The essence of a function call is that the calling function (caller) passes relevant data as arguments (or parameters) to the target function (callee), transfers control to the memory section holding the function's executable code, returns the result of the call, and at the same time, stores sufficient information to ensure that subsequent execution resumes immediately after the point where the original function call was made. This approach allows developers to express procedural instructions in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

Compilers are fundamental to modern computing. Translating human-oriented programming languages into computer-oriented machine languages, compilers allow computer programmers to ignore the machine-dependent details of machine language. Moreover, high-level languages are "portable," a feature which permits a single program to be implemented on several different machines, including ones of vastly different architecture. In this instance, the source program is "ported" (transferred) from one machine to another with little or no revision; instead, the program is simply re-compiled for each target machine. Thus, compilers allow programs and programming expertise to be machine-independent.

A compiler performs two basic tasks: analysis of the source program and synthesis of a machine-language program which instructs the computer to perform the task described by the source program. Most compilers are syntax driven, i.e., the compilation process is directed by the syntactic structure of the source program, as recognized by a compiler's parser. The parser builds the structure out of tokens, the lowest-level symbols used to define a programming language's syntax. This recognition of syntactic structure is a major part of the analysis task. Semantic routines actually supply the meaning (semantics) of the program, based on the syntactic structures. The semantic routines generate the target code or, optionally, some intermediate representation thereof.

Of particular interest to the present invention is the parsing of information in instances where duplicate information might be present, as is commonly the case. When developing a computer program, one often employs a multitude of source modules, with a program of even modest complexity requiring dozens of interdependent source modules. The general approach today to handling interdependencies, as exemplified by the C programming language, is to employ "header files." By "including" a header file in a source module, data structures and interface (function calls) of other modules become visible to the source module. For example, by "including" the header files for Microsoft Windows:

include <windows.h> in a source module, the module gains access to Windows data structures and function calls declared in the header file.

The module may be compiled without error into a standalone object module. Ultimately, the interdependent relations between the various object modules are resolved by the above-described "linking" process.

Although the header file approach affords an extremely flexible development environment, it is not particularly efficient in terms of compilation speed. It is not uncommon for a simple program to have a compilation time on the order of several minutes. Typical large-scale commercial applications, on the other hand, require several hours to compile. At the same time, there is typically much duplication of information—particularly information which makes its way into the compilation process via header files. While improved computer hardware, including faster processors and storage devices, has helped ease the problem, developers of computer programs still spend a significant portion of their time waiting idly while their programs are being compiled and re-compiled. Accordingly, there is much interest in improving the speed with which digital computers perform compilation of programs from source listings.

SUMMARY OF THE INVENTION

Often when parsing a set of information, a computer system is faced with processing large amounts of redundant data. The present invention recognizes a need for eliminating storage of redundant data which is routinely present in parsed information, particularly duplicate information present in header files ("#include" files) which are being parsed.

A preferred embodiment of the present invention comprises a development system having a compiler, a linker, and an interface. The compiler, which generates or "compiles" source listings into object modules, includes a parser for parsing information. In an exemplary embodiment, parsed information is (initially) stored in a parse tree.

The parse tree is processed by the system by the following method (or alternatively generated on-the-fly using the following method). At the outset, the system initializes a hash table. This table will store a unique address (signature) for a particular data object, or a particular set of common data objects. Once the hash table is initialized, the system recursively traverses the parse tree, typically in a "preorder" traversal (or the like)—proceeding down the left edge of the tree until a terminal node is located. Once the terminal node is located, its value is looked up in the hash table. If it is not stored in the table, it is installed in the table and its address (hash address) is returned to the tree, where the leaf value is replaced by the address. Once this terminal node has been processed, the system proceeds up the tree and takes the next left-most node, again processing it in the manner just described, and so on. In this manner, the parent node of a given node will be processed only after all the children of the given node have first been processed.

When two identical trees are encountered in a parse, they will hash to the same address and will be stored only once. If two trees differ by only a small amount, only the difference and the left edge of the second tree will be stored in addition to the first. As a source file is parsed, it is reduced to a single address in the hash table. Each #include statement in the parsed tree is also a single address. If two #include lines refer to the same header file, and there is no difference in their left context, then they will both have been reduced to the same address in the table.

In an exemplary embodiment, a method for storing parsed information to minimize storage of redundant data proceeds as follows. First, the system receives input of parsed information stored as a collection of data members arranged in a hierarchical format (e.g., output from a compiler's parser). Next, for each data member in the parsed information, a hash address for storing the data member in a hash table is computed. The data member is stored in the hash table at the computed hash address if another data member having an identical computed hash address has not already been stored in the hash table. If another data member having an identical computed hash address has already been stored in the hash table, however, the hash address of the other data member which has already been stored in the hash table is stored in place of the data member.

The method may be embodied at parsing (i.e., while a parse tree is being constructed on-the-fly). In such an embodiment, the parse tree is constructed by tokenizing the information (e.g., by a scanner routine which returns the "next token"). For each token, the token is stored in a table if a token of identical value has not yet been stored in the table; the token is stored at a memory address determined in part from a value expressed by the token, such as a hash address computed from a hash function. If a token of identical value has already been stored in the table, its address is employed. The parse tree itself is constructed so that for a given token, the tree contains a node storing the memory address determined for the token. In this manner, portions of the parse tree having duplicate information store only a memory address which references a single copy of the duplicate information.

All told, the system of the present invention may efficiently store parse trees that have duplicated nodes, such as those produced when a text file is included more than once in a program. The memory storage required is dramatically decreased because the approach eliminates storage of redundant information. Moreover, comparison operations are facilitated because comparing two subtrees for equality reduces to simply comparing two addresses. Comparison between two data objects may be rapidly achieved using simple machine word (e.g., 32-bit) comparison instructions, as opposed to performing elaborate comparisons between the many nodes of the data object (subtree), or long substring comparison operations.

BRIEF DESCRIPTION OF THE DRAWINGS

FIG. 3A is a diagram illustrating construction of a tree data structure.

FIG. 3B is a diagram illustrating construction of a hash table.

FIG. 3C is a diagram illustrating steps of a hash routine or method employed by the present invention.

FIG. 3D is a diagram illustrating a store tree routine or method of the present invention for recursively processing parse trees.

GLOSSARY

Edge: A path in a tree from one node to a descendent node.

Hash table: A data structure consisting of elements that are found by calculating an address based on some characteristic of the contents of the element.

Leaf: An element that does not point to any children.

Left context: The nodes and leaves in the tree which occur before a chosen node in a preorder walk of the tree.

Node: An element in a tree that points to at least one child.

Operator: A node in a parse tree that corresponds to a verb in the text, such as the arithmetic operator "+".

Parse: The processing of text, recognizing a grammar, and translating the text into another form, such as a tree.

Parse tree: The tree, generated upon parsing text, that stores parse information in a hierarchical format.

Preorder: A method of traversing ("walking") a tree where each node in the tree is visited, starting at the root, such that the children of a node are processed before the node itself, starting with the leftmost child, and proceeding right.

Root: The first element in a tree, the root is not a child of any node.

Tree: A data structure where each element can point to one or more other elements, called children.

DETAILED DESCRIPTION OF A PREFERRED EMBODIMENT

The following description will focus on a preferred embodiment of the present invention which is operative in an environment supporting page-based virtual memory management, such as found in Intel 80x86-compatible systems. The present invention, however, is not limited to any particular application or any particular environment. Instead, those skilled in the art will find that the system and methods of the present invention may be advantageously applied to a variety of platforms and environments. Therefore, the description of the exemplary embodiments which follows is for purposes of illustration and not limitation.

General Architecture

A. System Hardware

Figure 1A:
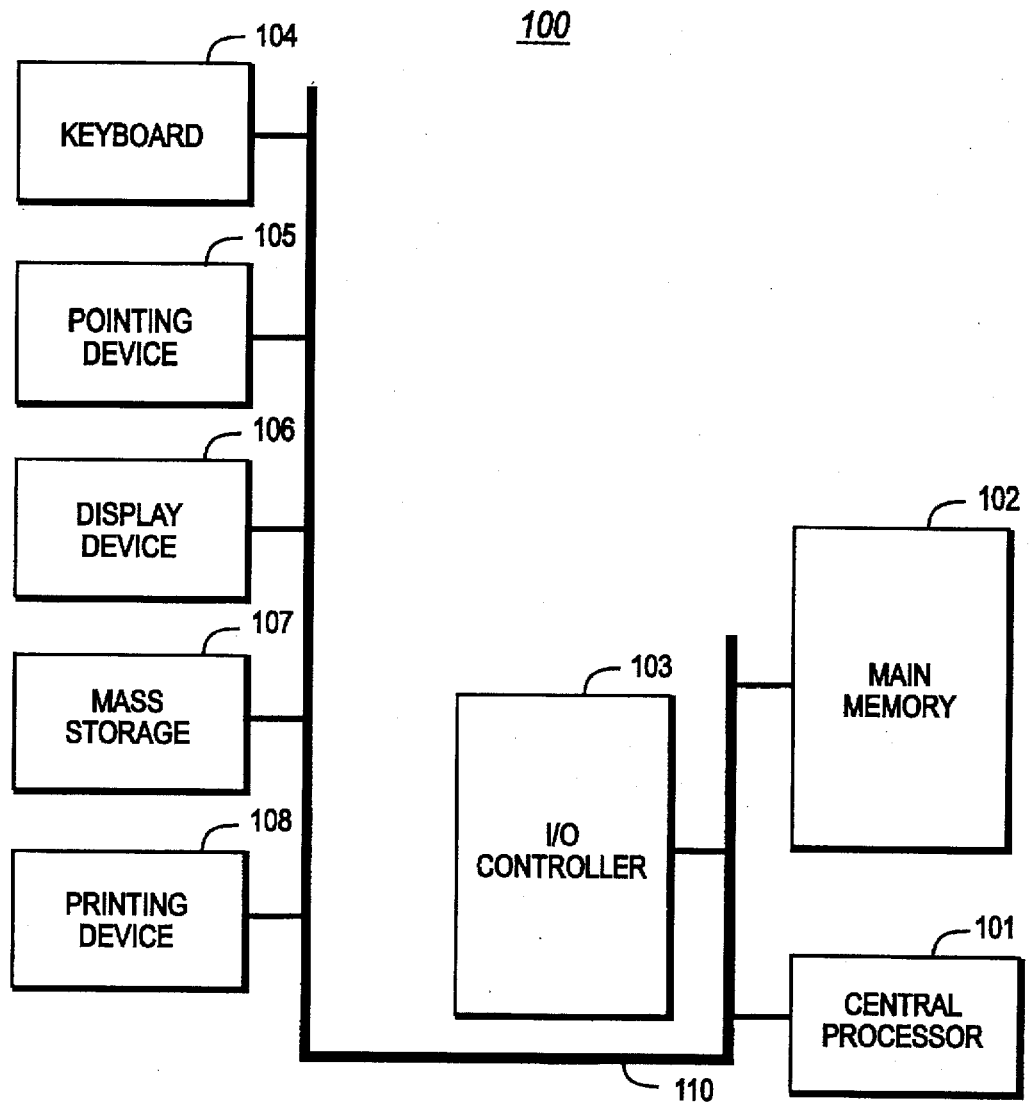
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory for storing frequently accessed information; cache memory may be an on-chip cache or external cache, as is known in the art. Additional input/output devices, such as a printing device 108, may be provided with the system 100 as desired. As shown, the various components of the system 100 communicate through a system bus 110 or similar architecture.

B. System Software

Figure 1B:
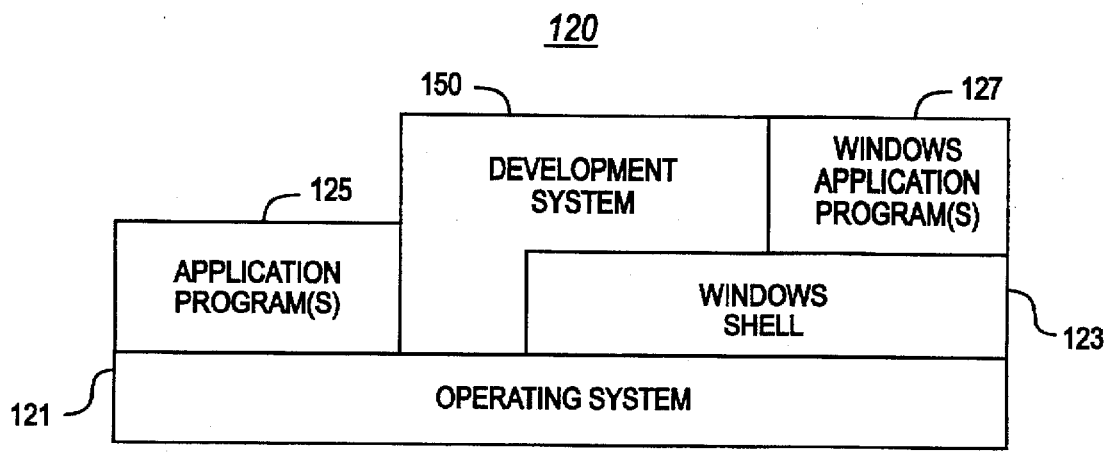
FIG. 1B is a block diagram of a software system for controlling the operation of the system of FIG. 1A.

Illustrated in FIG. 1B, a computer software system 120 is provided for programming the operation of the computer system 100. Software system 120, which is stored in system memory 102 and/or on disk memory 107, includes a kernel or operating system (OS) 121 and a windows shell or interface 123. One or more application programs, such as application programs 125 or windows applications program(s) 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development systems 150 include Borland® C++, available from Borland International of Scotts Valley, Calif. Application software 125, 127, on the other hand, can be any one of a variety of application software, including word processing, database, spreadsheet, text editors, and the like.

C. Development System

Figure 1C:
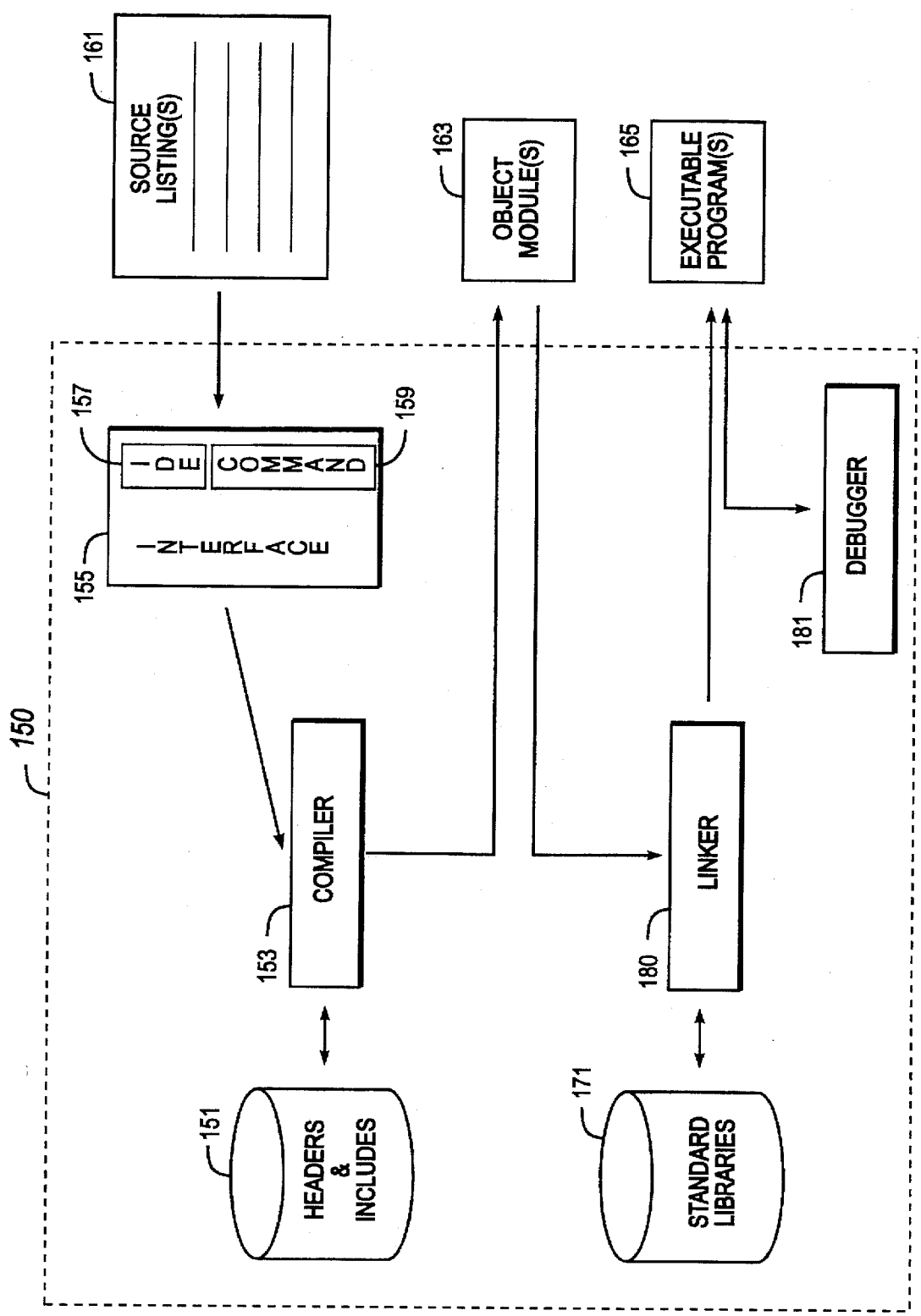
FIG. 1C is a block diagram of a development system of the present invention.

Shown in further detail in FIG. 1C, the development system 150 of the present invention includes a compiler 153, a linker 180, and an interface 155. Through the interface, the developer user supplies source modules 161 to the compiler 153. Interface 155 includes both command-line driven 159 and Integrated Development Environment (IDE) 157 interfaces, the former accepting user commands through command-line parameters, the latter providing menuing equivalents thereof. After tokenizing and parsing the source code or listings 161 and headers/includes files 151, the compiler 153 "compiles" or generates object module(s) 163. In turn, linker 180 "links" or combines the object modules 163 with libraries 171 to generate program(s) 165, which may be executed by a target processor (e.g., processor 101 of FIG. 1A). The standard libraries 171 include previously-compiled standard routines, such as graphics, I/O routines, startup code, math libraries and the like. The user developer may designate other libraries (e.g., custom libraries) whose code is to be linked into the target executable.

In a preferred embodiment, the compiler includes Borland® C++ compiler. A description of the general operation of development system 150 is provided with Borland® C++, available directly from Borland International. In particular, the reader may consult the following manuals: (1) *Borland C++ User's Guide*, (2) *Borland C++ Programmer's Guide*, and (3) *Borland C++ Tools and Utilities Guide*, all available from Borland International. For a general introduction to the construction and operation of compilers, see Fischer et al., *Crafting a Compiler* with C, Benjamin/Cummings Publishing Company, Inc., 1991. The disclosures of each of the foregoing are hereby incorporated by reference.

A debugging module 181 is provided for tracking and eliminating errors in the programs 165. During compilation of a program, a developer user may specify that the program is to be compiled with "debug info." Debug info is used by the debugger 181 for tracking execution of the debuggee with the corresponding source listings. The general construction and operation of debuggers is well described in the technical, trade, and patent literature. See e.g., Pietrek, M., *Writing a Windows Debugger*, Windows/DOS Developer's Journal, pp. 6–12, June 1992. Particular user operation of the debugger 181 is described in *Borland C++: User Guide* Chapter 6: Using the integrated debugger, Part No. BCP1240WW21770, Borland International, 1993. Formats for debug info are described in the technical literature; see e.g., *Borland Languages: Open Architecture Handbook*, Part No. 14MN-RCH01-10, Borland International, 1991.

Before describing methods of the present invention for detecting and processing of duplicate information, it is helpful to briefly review the relationship between header files, source files, library files, and final executable code modules. This relationship is perhaps best understood by tracing the genesis of a program from source code listings to object code modules, and then finally to an executable (binary) program image. In this manner, readers unfamiliar with general program development may better appreciate the relationship between source modules and header files.

Genesis of an Executable Program

A. Sample source, headers, and object files

Figure 2A:
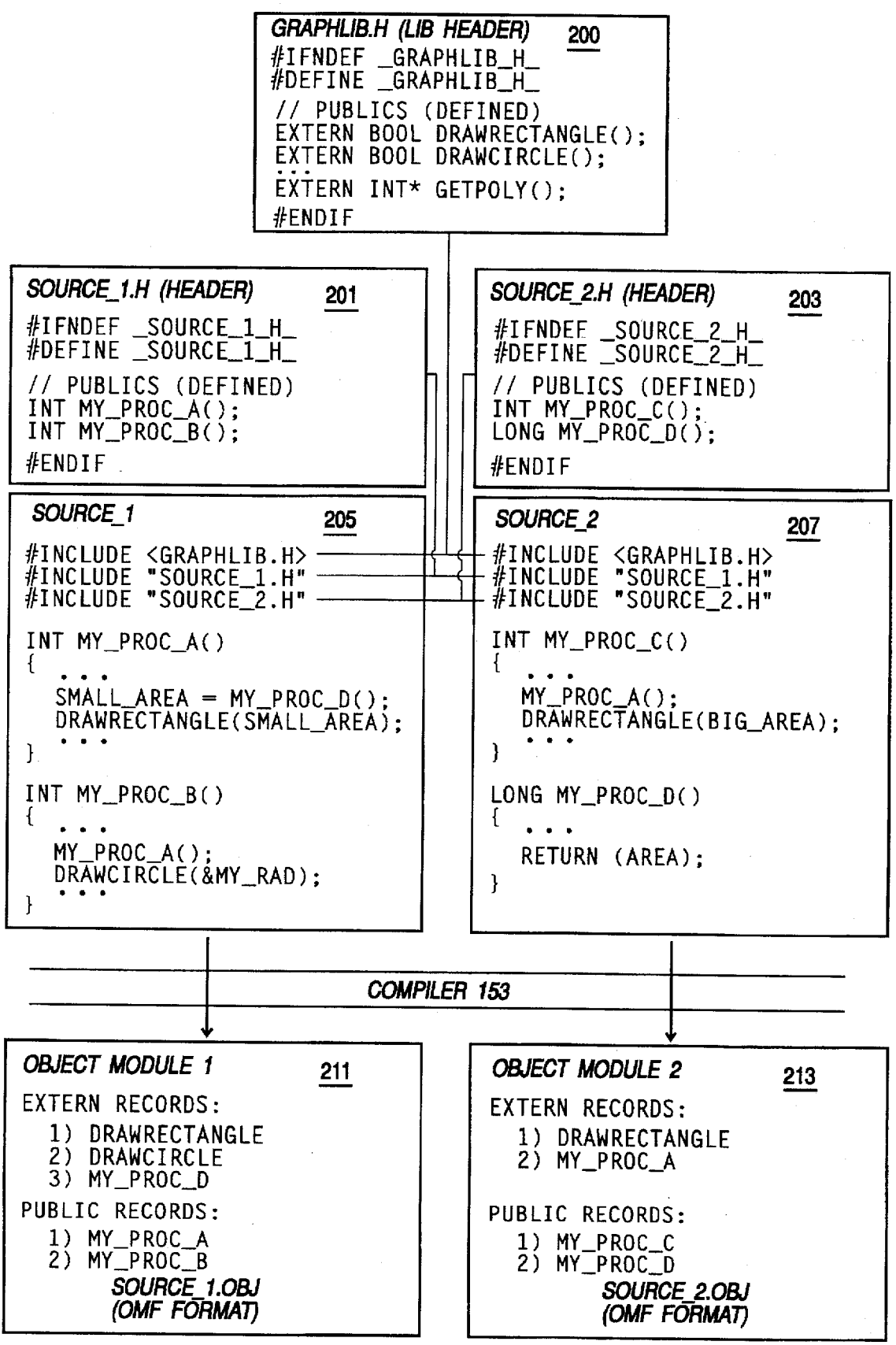
FIG. 2A is a block diagram illustrating the process (of the development system of FIG. 1C) for compiling source modules and header files into object code modules.
Figure 2B:
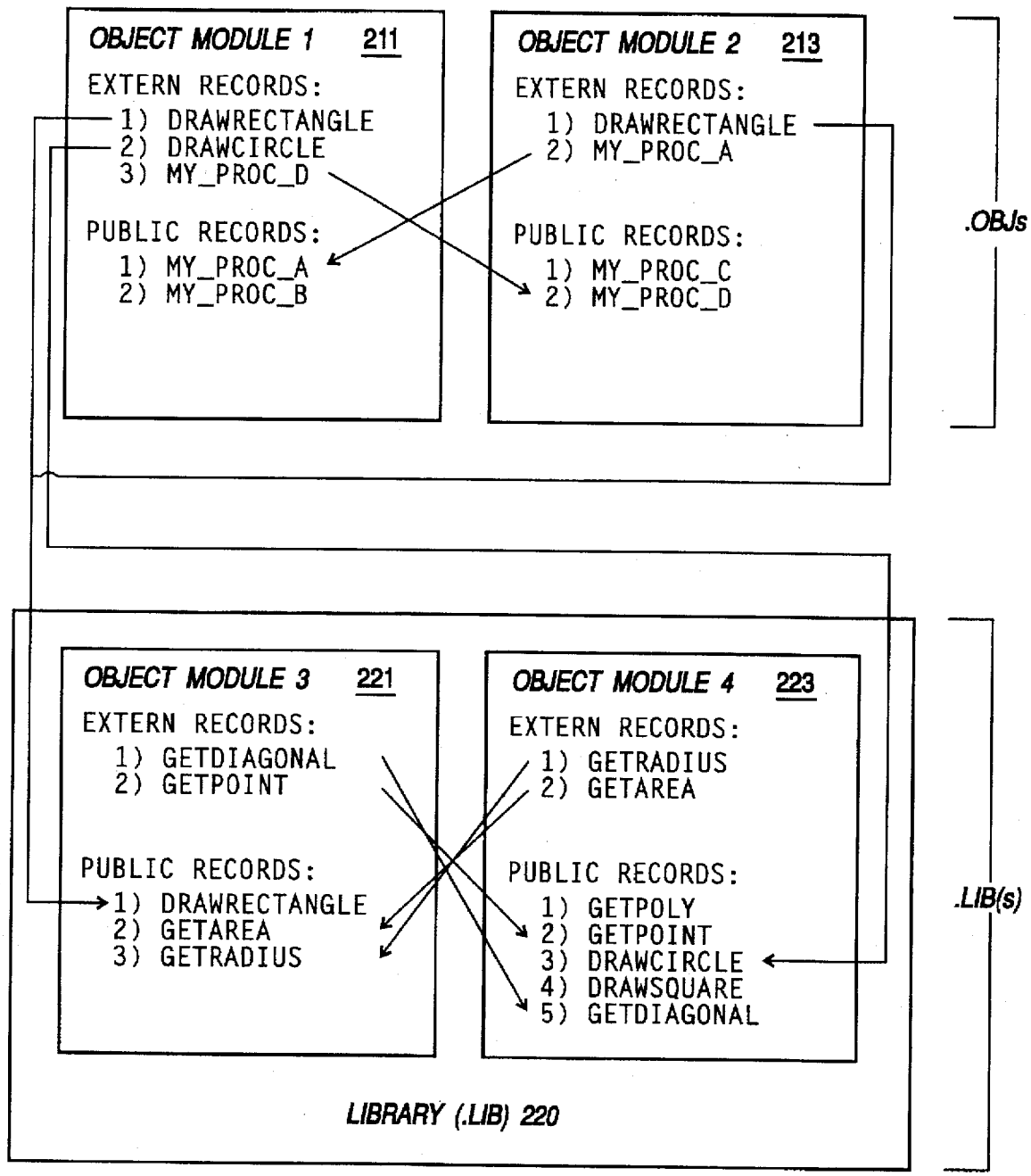
FIG. 2B is a block diagram illustrating various dependencies between procedures which may exist (among object modules and/or libraries).

The relationship between various source and header files, and corresponding object modules is illustrated in FIGS. 2A-B. Source modules 205, 207 illustrate typical source code modules, such as would be supplied to the compiler 153 for generating modules of object code. Each module 205, 207 includes certain symbols which are "external" to the module and others which are "public" to the module. Symbols which are external are defined in another module; symbols which are public are defined within the module.

Within the SOURCE_1 source 205, the MY_PROC_A routine is "declared"—that is, its full function declaration is provided. The routine is now available for use globally (i.e., "public" visibility) within that source module 205. By defining the symbol in the accompanying header file 201, the routine is made available to other source modules. For instance, the routine (and other routines of source module 205) are visible to the SOURCE_2 source module 207 which "includes" the SOURCE_1 header file 201. Similarly, routines or functions of SOURCE_2 are made available to SOURCE_1 module 205 by that module's "including" of header file 203.

Often, however, it is desirable to invoke routines which may be defined elsewhere, such as in a library file purchased from a third party vendor (e.g., GRAPHLIB library 220). As shown for the MY_PROC_A routine, for instance, a DRAWRECTANGLE routine is called. The DRAWRECTANGLE routine is declared elsewhere—the actual steps for the routine are set forth in the library module. Thus, the symbol "DRAWRECTANGLE" is "external" to the source module 205. By "including" the header file which defines DRAWRECTANGLE, GRAPHLIB header 200, the module 205 may be compiled into an object module which calls (references) the DRAWRECTANGLE routine.

The individual translator outputs or object modules ("OBJs") store a plurality of records describing the object language (e.g., Intel 80×86) used for input and output of object language processors, such as linkers and librarians. The basic layout of an 80×86 OBJ module and its records is defined by the Intel Object Module Format (OMF). These outputs are linked together to create the final executable program.

For the object modules 211-213, the compiler 153 emits a particular OMF record for a symbol, based upon whether it is an external or public reference. For the object module 211, for example, references to DRAWRECTANGLE, DRAWCIRCLE, and MY_PROC_D are stored in the object modules as external records. On the other hand, the two routines defined in source module 205—MY_PROC_A and MY_PROC_B—are stored as public records. The object module which source module 207 compiles into is also shown (as object module 213).

A detailed discussion of the Object Module Format (OMF) standard, including Microsoft's extensions, is available in the technical literature: (1) 8086 *Relocatable Object Module Formats*, Intel Corporation, 1981; (2) *Microsoft C Developer's Toolkit Reference*, Microsoft Corporation, 1990; and (3) The *MS-DOS Encyclopedia*, Microsoft Press, 1988. The disclosures of each of the foregoing are hereby incorporated by reference.

All told, there are dependencies between the various modules which exist. FIG. 2B illustrates dependencies 250 which may exist, for example, for the object modules 211, 213. Source module 205 generates object module 211. The module 211 includes three external references: 1) DRAWRECTANGLE, 2) DRAWCIRCLE, and 3) MY_PROC_D. The first two externals are satisfied by a library file 220, which itself is comprised of a plurality of object modules (e.g., object modules 221, 223). As is known in the art, a library essentially comprises a collection of object modules; an exemplary library format is that provided by Microsoft for MS-DOS (see e.g., The *MS-DOS Encyclopedia*, Microsoft Press, 1988). The third external reference (MY_PROC_D) is satisfied by the companion object module 213; that is, the module 213 includes a public record for MY_PROC_D which satisfies the corresponding external record for the object module 211. Thus as shown by FIG. 2B, a multitude of interdependencies may exist, all of which must be satisfied during linking to create a valid executable program.

B. Emitting an Executable Image (Linking)

From the object file(s) and library file(s), an executable program may finally be generated. In general operation, a linker, such as linker 180, proceeds to scan the object module files desired to be included in the link operation. The linker also scans the object modules contained in any library files which have been specified to be included in the link. The linker gathers sufficient information to determine requirements for creating the executable, such as memory resources which are required by internal tables for the link operation.

After processing all of the object module files and library files, the linker determines which of the object modules contained in the library files are actually necessary to the link. A module is marked as "needed" if it contains one or more public records (e.g., OMF PUBDEF Records) that have been referenced via an external record (e.g., OMF EXTDEF Record) in another object module. The linker may then proceed to reprocess all of the object modules contained in the object files and any of the object modules contained in the library files but only for those which were marked as "needed." Any object modules in libraries that are not needed are skipped (i.e., not read into memory). As the object modules are processed, the executable image (Program 165 of FIG. 1C) is constructed and emitted.

Information parsing and redundancy

A. Parsing

Every programming language has a syntax—a set of grammar rules which specifies how statements and expression in that language are correctly written. A language's syntax dictates how compilers and interpreters translate programs. Knowledge about a source languages syntax is built into the "parser" of a compiler, such as compiler 153. The parser controls the translation process, since it analyzes the source program based on the syntax. It calls scanner routines to give it tokens, and it calls symbol table routines to enter and search for identifiers.

The structure of a parser's routines is dictated largely from the syntax or formal grammar of the underlying language. The syntax describes how sentences can be formed in a general way. The parser's subroutines use the grammar to build a "parse tree"—a convenient way for a computer to represent a sentence diagram.

B. Tree data structures

In programming, information is often organized into data structures, such as arrays, linked lists, stacks, and queues. All of these data structures are linear or one-dimensional by nature. The tree data structure, on the other hand, is non-linear: its root, branches, and leaves (terminal nodes) provide a representation of information organized as a hierarchy. A tree is typically viewed as being inverted, that is, its root is located at the top and its branches spread out in a downward direction. A group or set of nodes and branches below a given node is known as a "subtree." A tree can have many branches and each branch, in turn, can have many other branches.

Hierarchical information may be conveniently represented with a "binary tree"—that is, trees whose nodes have, at most, two (immediate) children. As with all trees, a binary tree begins with a root node. When the tree is empty, this node has zero branches. As data items are added to the tree, however, the tree grows so that the node contains a maximum of two branches. In this regard, the node is the "parent" and each branch leads to a "child" node. Since each node may have up to two children and each child may, in turn, serve as a parent, a binary tree can be arbitrarily deep.

A common application of trees in computing is for representing expressions, such as ones commonly found in source listings. Consider, for instance, the following expression:

A*B+C

Figure 2C:
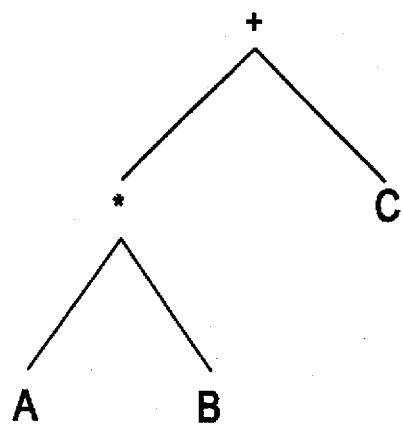
FIG. 2C is a diagram illustrating use of a binary tree for storing parsed information.

Since each operator is binary, the expression can easily be represented with a parse tree 270, as shown in FIG. 2C. In this simple tree, each node stores only a single unit (e.g., character) of data. However, the structure can easily be modified to store more information, or to contain pointers to larger data structures.

Traversing a tree is the process of moving through the tree, visiting some or all of the nodes of the tree. Visiting a node involves attaining the node's data and (optionally) using it, for instance, for comparison, sorting, or the like. Often, it is necessary to visit the nodes in some specified sequence. By maintaining a tree in some sorted order of node values, one can locate any given node by value in a rapid fashion. If a tree is reasonably well-balanced, each node will be approximately mid-way between each of its subtrees.

The sequence or order in which a binary tree can be traversed is categorized into various forms of tree traversal. If every node of a binary tree is to be visited exactly once, the traversal method can be reduced to just a few recursive steps. Although different methods of tree traversal may be employed, a "preorder" traversal provides an exemplary traversal order for describing the method of the present invention. In a preorder traversal or "walk" of a tree, each node in the tree is visited, starting at the root, such that the children of a node are processed before the node itself, starting with the leftmost child, and proceeding right. Those skilled in the art will appreciate that the teachings of the present invention may be modified to accommodate other traversal methods as well as other data storage structures.

A general introduction to the topic may be found in Sedgewick, R., *Algorithms in C,* Addison-Wesley, 1990; and in Knuth, D., *Sorting and Searching,* The Art of Computer Programming: Vol. 3, Addison-Wesley, 1973. The disclosures of each of the foregoing are hereby incorporated by reference.

C. Redundancy

With a general understanding of parsing and parse trees, the reader may now better understand the prevalence of redundant information present in parsed information, particularly header files in a development environment. Consider, for instance, generation of a parse tree for a computer program having a function which returns, at various locations throughout the function, the value of a+b, for example:

```
int foo( int a, int b )
{
    // set condition_1, condition_2, condition_3 flags
    // ...
    if ( condition_1 )
    {
        // modify a and b for condition_1
        // ...
        return ( a + b );
    }
    else if ( condition_2 )
    {
        // modify a and b for condition_2
        // ...
        return ( a + b );
    }
    else if ( condition_3 )
    {
        // modify a and b for condition_3
        // ...
        return ( a + b );
    }
    // and so forth
}
```

The statement a+b is itself a "little subtree," which may occur several times throughout the text of the program. The various subtrees present in a parse may in fact become quite large.

Moreover, the situation is exacerbated in those environments using header files (e.g., C/C++ programming environments), where a parser must parse several instances of the very same header file. Since the very same header file may adopt a different context from one source module to another, it must be parsed once for each source module in which it has been "included." Consider, for instance, the inclusion of WINDOWS.H—the header file for Microsoft Windows—in various source modules for a Windows application program. Which parts of WINDOWS.H that are actually included in a given source module depends on what context the source module has "defined." For example, the source module may prevent inclusion of Windows Kanji support by simply defining "NOKANJI":

define NOKANJI

Another source module, although it "includes" WINDOWS.H, may extract entirely different pieces from that header file by "defining" different areas of the header file to be of interest. All told, a parser must parse each instance of a header file to make sure the individual pieces sought from the header file are included.

"Conditional compilation" constructs, such as #define, modify exactly which parts of the header file are actually included and thus limit the ability of systems to eliminate subsequent parsing of the same information. In particular, even though it is possible to store the header files in a pre-tokenized form (e.g., Borland's "precompiled" header files), each include instance of a header file must still be parsed to discern exactly what information is to be extracted. The exact path or "context" of the header file being brought in is dictated by the #define statements in the source module which has included the header file. Since the parser must parse each instance of a header file to determine what are the individual pieces sought, there is typically much duplication of information between each inclusion of a given header file. Method for detecting and processing shareable information A. General method A method of the present invention for quickly detecting and processing shareable information in parse trees (e.g., symbol and type information from header files) will now be described. The method may process a previously-built parse tree data object or, alternatively, construct a parse tree on the fly (storing node data as described below). The parse tree itself may be built in a conventional manner using known parsing methodology (e.g., recursive descent parsing or the like) as the actual construction is not critical to implementation of the present invention; as described below, however, storage of parsed information is modified so that storage of redundant information is eliminated.

For purposes of clarity, the following description will focus on processing a pre-existing parse tree. Once the parse tree has been received by the system (e.g., an input or as intermediate output from a compiler's parser), the method proceeds to process the tree as follows. At the outset, a hash table is initialized. This table will store a unique address (signature) for a particular data object, or a particular set of common data objects. Hash-addressing or simply "hashing" is a well known technique for providing fast, direct access to a specific data record which is stored at a location on the basis of the record's value. In hashing, each information record is stored at a location whose address is computed as some function (the "hash function") of some value or field of that record (the "hash field" or "hash key"). To initially store a record, the system computes the hash address for the record and then places the record at that computed position. For retrieval of the record in subsequent operations, the system, given the hash field value, can perform the same computation as before, thus computing the position from which the record should be fetched.

A trivial example of a hash function is the "division/ remainder" approach. Consider, for instance, a hypothetical vendor who must maintain an inventory of the following part numbers: 100, 200, 300, 400, and 500. By defining (arbitrarily) a hash function, a hash address may be computed. For instance, one could define a modulus function for each part to be the remainder of the part number divided by the value of 13, as follows:

hash address=part number % 13

This yields a hash address for the five parts of 9, 5, 1, 10, and 6, respectively.

In hashing, the elements are typically stored in a table, called the "hash table." The hash table, which is typically organized as an array, stores the data elements, or pointers to the list of elements. Thus, a hash table is usually implemented either as an array of buckets, with each bucket holding one or more slots for elements, or as an array of pointers, which point to lists of elements. Further description of hashing may be found in the above-mentioned *Algorithms in C*.

Continuing with the method of the present invention, once a hash table is initialized the method recursively traverses the parse tree, in a "preorder" traversal, as follows. The method proceeds down the left edge of the tree until a terminal node is located. Once the terminal node is located, its value is looked up in the hash table. If it is not stored in the table, it is installed in the table and its address (hash address) is returned to the tree, where the node value is (effectively) replaced by the address.

As described below (at FIG. 3D), the preorder walk is accomplished by recursing into the left child of the parse tree, then the right child, and finally hashing the current node itself, using the stored string and the results of the left and right recursive calls. In this manner, a parent node will be visited only after its children have first been processed. Processing of a parent node itself will be described by example. Suppose a parent and its children store A * B—that is, the left child node stores A, the right child node stores B, and the parent node stores *. A hash value for the parent is calculated from the value of the parent (i.e., "*" character) hashed with the addresses of A and B, thereby generating a signature for the node. This hash value is looked up in the hash table and installed if necessary. The process continues from left to right until the entire tree has be traversed.

When two identical trees are encountered in a parse, they will hash to the same address and will be stored only once. If two trees differ by only a small amount, only the difference and the left edge of the second tree will be stored in addition to the first. As a source file is parsed, it is reduced to a single address in the hash table. Each #include statement in the parsed tree is also a single address. If two #include lines refer to the same header file, and there is no difference in their left context, then they will both have been reduced to the same address in the table.

Each hash entry can carry additional information, if desired. For instance, the hash table entry for each tree can be labeled with information about where in the text it was found (e.g., byte offset from the beginning of the file). This information can be included in the hash, so that identical trees from different files can be distinguished, as desired or needed (e.g., for browsing, error reporting, or the like). Although this reduces the storage space savings somewhat, the majority of the savings comes from not saving a header file twice. Each hash entry can also carry information that is not included in the hash, such as a pointer to generated code, pointers into the symbol table, and the like.

B. Preferred embodiment

Referring now to FIGS. 3-4, construction of a preferred embodiment will now be described. As shown in FIG. 3A, a tree data structure 300 may be declared as an array of simple binary tree nodes, and a counter 310 of how many nodes have been used.

```
struct tree
{
    char *name;
    tree *l, *r;
} trees[4096];
int ntrees = 0;
```

As shown in FIG. 3B, a hash table 320 of binary tree nodes and a counter 325 of how many hash table entries have been used may be declared.

```
const int HASH_SIZE = 1999;   // Should be prime
struct hash_table
{
    char *str;
    int l, r;
    int visits;
} ht[HASH_SIZE];
int num_hashed = 0;
```

Next, a hash routine 330, hash(), is constructed, as shown in FIG. 3C. Any hash can be used. For purposes of illustration, a trivial example is employed; this can be replaced by one optimized for the particular task/data at hand. An exemplary routine operates as follows. Shown at 331, a hash address is first calculated into a variable, h. Next, a while loop is employed at 333 to check whether the address has been filled yet. If it has been filled, the contents are compared to the arguments, and if they are equal, the routine simply returns the address at 335, without storing the data redundantly. If the arguments are not equal to the addressed node, a new hash address is calculated at 337, and the loop iterates until either a match is found or an empty slot is found. If an empty slot is found, then the arguments are unique, and are stored in the table at 339, and the address is returned at 340.

```
int
hash ( char *str, int 1 = 0, int r = 0 )
{
    int h = 1;
    char *s = str;
    while( *s )              //multiply bytes into h
        h *= *s++;
    h += 1 + r;              // add the other arguments
    if( h < 0 )              // worry about negatives
        h = -h;
    if( h <= 0 )             // add the two numbers
        h = 1;               // which have no negative.
    h %= HASH_SIZE;
    while( ht[h].str )
    {
        if( ht[h].1 == 1 && ht[h].r == r &&
            ! strcmp(ht[h].str,str) )
            return h;
        h = (h * h + 5) % HASH_SIZE;
    }
    if( num_hashed++ >= HASH_SIZE-1 )
        return 0;
    ht[h].str = new char[ strlen(str)+1 ];
    strcpy( ht[h].str, str );
    ht[h].1 = 1;
    ht[h].r = r;
    return h;
}
```

Finally, a tree-packing method 350, store_tree(), is then declared for performing a preorder walk of a parse tree and building a hash table representing the parse tree without storing redundant nodes. The preorder walk is accomplished by recursing into the left child of the parse tree (shown at 351), then the right child (shown at 353), and finally hashing the current node itself (shown at 355), using the stored string and the results of the left and right recursive calls.

```
int
store_tree( tree *t )
{
    if( t == 0 )
        return 0;
    int 1 = store_tree( t->1 );
    int r = store_tree( t->r );
    return hash( t->name, 1, r );
}
```

A source code appendix is included herewith which sets forth C language routines which demonstrate use of the tree-packing method of the present invention. A suitable compiler for compiling the source listings is available from a variety of vendors, including Borland International of Scotts Valley, Calif.

Advantages

The method described herein allows a parser to efficiently store parse trees that have duplicated nodes, such as those produced when a text file is included more than once in a program. For instance, the size (amount) of memory or storage required is dramatically decreased because the approach eliminates storage of redundant information. If the ordering of #includes does not affect the tree, then the tree is stored once. If the ordering does affect the tree, the tree is stored in an efficient manner, without copying any subtrees that are shared.

Also, comparing two subtrees for equality reduces to comparing two addresses. In this manner, comparison operations are greatly facilitated: large amounts of data may be compared by simply comparing signatures (typically, 32-bit addresses), instead of performing a more complex comparison operation for the underlying data. In other words, comparison between two data objects may be rapidly achieved using simple machine word (e.g., 32-bit) comparison instructions, as opposed to performing elaborate comparisons between the many nodes of the data object (subtree), or long substring comparison operations.

Test Data

The reduction of redundant information will now be demonstrated with sample information. Given input information of:

```
smiler(
    bingo(
        fragmat(
            ingmar(
                frump(dingbat),
                frazzle(
                    corn(
                        floozy(barndoor,finger),
                        faceless
                    ),
                    muffin(
                        frump(DINGBAT),
                        corn(
                            floozy(barndoor,finger),
                            faceless
                        )
                    )
                )
            )
        ),
        fragmat(
            ingmar(
                frump(dingbat),
                frazzle(
                    corn(
                        floozy(barndoor,finger),
                        faceless
                    ),
                    muffin(
                        frump(DIFFERENT),
                        corn(
                            floozy(barndoor,finger),
                            faceless
                        )
                    )
                )
            )
        ),
        bang(
            frimp(
                cuckoo(
                    boil,
                    bottom(
                        bouncer(bam,bam),
                        frill(
                            frighten(fool),
                            fate
                        )
                    )
                ),
                frazzle(
                    corn(
                        floozy(barndoor,finger),
                        faceless
                    ),
```

```
muffin(
    frump(DINGBAT),
    corn(
        floozy(barndoor,finger),
        faceless
    )
  )
),
fry(
    fat(
        fancy,
        free
    ),
    gone
  )
)
```

Yields a parse tree of:

| | | |
|---|---|---|
| 0x0004214c | smiler | 0x00042158 0x00042314 |
| 0x00042158 | bingo | 0x00042164 0x0004223c |
| 0x00042164 | fragmat | 0x00042170 0x00000000 |
| 0x00042170 | ingmar | 0x0004217c 0x00042194 |
| 0x0004217c | frump | 0x00042188 0x00000000 |
| 0x00042188 | dingbat | 0x00000000 0x00000000 |
| 0x00042194 | frazzle | 0x000421a0 0x000421dc |
| 0x000421a0 | corn | 0x000421ac 0x000421d0 |
| 0x000421ac | floozy | 0x000421b8 0x000421c4 |
| 0x000421b8 | barndoor | 0x00000000 0x00000000 |
| 0x000421c4 | finger | 0x00000000 0x00000000 |
| 0x000421d0 | faceless | 0x00000000 0x00000000 |
| 0x000421dc | muffin | 0x000421e8 0x00042200 |
| 0x000421e8 | frump | 0x000421f4 0x00000000 |
| 0x000421f4 | DINGBAT | 0x00000000 0x00000000 |
| 0x00042200 | corn | 0x0004220c 0x00042230 |
| 0x0004220c | floozy | 0x00042218 0x00042224 |
| 0x00042218 | barndoor | 0x00000000 0x00000000 |
| 0x00042224 | finger | 0x00000000 0x00000000 |
| 0x00042230 | faceless | 0x00000000 0x00000000 |
| 0x0004223c | fragmat | 0x00042248 0x00000000 |
| 0x00042248 | ingmar | 0x00042254 0x0004226c |
| 0x00042254 | frump | 0x00042260 0x00000000 |
| 0x00042260 | dingbat | 0x00000000 0x00000000 |
| 0x0004226c | frazzle | 0x00042278 0x000422b4 |
| 0x00042278 | corn | 0x00042284 0x000422a8 |
| 0x00042284 | floozy | 0x00042290 0x0004229c |
| 0x00042290 | barndoor | 0x00000000 0x00000000 |
| 0x0004229c | finger | 0x00000000 0x00000000 |
| 0x000422a8 | faceless | 0x00000000 0x00000000 |
| 0x000422b4 | muffin | 0x000422c0 0x000422d8 |
| 0x000422c0 | frump | 0x000422cc 0x00000000 |
| 0x000422cc | DIFFERENT | 0x00000000 0x00000000 |
| 0x000422d8 | corn | 0x000422e4 0x00042308 |
| 0x000422e4 | floozy | 0x000422f0 0x000422fc |
| 0x000422f0 | barndoor | 0x00000000 0x00000000 |
| 0x000422fc | finger | 0x00000000 0x00000000 |
| 0x00042308 | faceless | 0x00000000 0x00000000 |
| 0x00042314 | bang | 0x00042320 0x0004244c |
| 0x00042320 | frimp | 0x0004232c 0x000423a4 |
| 0x0004232c | cuckoo | 0x00042338 0x00042344 |
| 0x00042338 | boil | 0x00000000 0x00000000 |
| 0x00042344 | bottom | 0x00042350 0x00042374 |
| 0x00042350 | bouncer | 0x0004235c 0x00042368 |
| 0x0004235c | bam | 0x00000000 0x00000000 |
| 0x00042368 | bam | 0x00000000 0x00000000 |
| 0x00042374 | frill | 0x00042380 0x00042398 |
| 0x00042380 | frighten | 0x0004238c 0x00000000 |
| 0x0004238c | fool | 0x00000000 0x00000000 |
| 0x00042398 | fate | 0x00000000 0x00000000 |
| 0x000423a4 | frazzle | 0x000423b0 0x000423ec |
| 0x000423b0 | corn | 0x000423bc 0x000423e0 |
| 0x000423bc | floozy | 0x000423c8 0x000423d4 |
| 0x000423c8 | barndoor | 0x00000000 0x00000000 |
| 0x000423d4 | finger | 0x00000000 0x00000000 |
| 0x000423e0 | faceless | 0x00000000 0x00000000 |
| 0x000423ec | muffin | 0x000423f8 0x00042410 |
| 0x000423f8 | frump | 0x00042404 0x00000000 |
| 0x00042404 | DINGBAT | 0x00000000 0x00000000 |
| 0x00042410 | corn | 0x0004241c 0x00042440 |
| 0x0004241c | floozy | 0x00042428 0x00042434 |
| 0x00042428 | barndoor | 0x00000000 0x00000000 |
| 0x00042434 | finger | 0x00000000 0x00000000 |
| 0x00042440 | faceless | 0x00000000 0x00000000 |
| 0x0004244c | fry | 0x00042458 0x0004247c |
| 0x00042458 | fat | 0x00042464 0x00042470 |
| 0x00042464 | fancy | 0x00000000 0x00000000 |
| 0x00042470 | free | 0x00000000 0x00000000 |
| 0x0004247c | gone | 0x00000000 0x00000000 |

The above parse tree has 69 tree nodes. Applying the method of the present invention for eliminating redundant information, this may be reduced to a hash table having 37 nodes—a reduction in data storage of almost 50%.

While the invention is described in some detail with specific reference to a single preferred embodiment and certain alternatives, there is no intent to limit the invention to that particular embodiment or those specific alternatives. For instance, although the preferred embodiment has employed a binary tree for storing parsed information, those skilled in the art, enabled by the teachings of the present invention, will appreciate that other data collection structures, such as stacks, queues, and linked lists, may also be employed. Also, a preorder walk employed in a preferred embodiment is only one of a set of tree traversal methods which may be employed. Postorder traversal, as well as any traversal that covers the children nodes only once and the parent last, may be employed. Thus, the true scope of the present invention is not limited to any one of the foregoing exemplary embodiments but is instead defined by the appended claims.

SOURCE CODE APPENDIX

The following routines exemplify use of the tree-packing method described above. Input text is read into memory, parsed into a parse tree, then packed efficiently into the hash table by calling store_tree().

```c
int tabs = 0;
void print_hash( int h )
{
    if( h == 0 || ht[h].str == 0 )
        return;
    printf("%5d %d ", h, ht[h].visits );
    ht[h].visits++;
    for( int x = 0; x < tabs; x++ )
        printf("  ");
    printf("%s %d %d\n",
        ht[h].str, ht[h].1, ht[h].r );
    tabs++;
    print_hash( ht[h].1 );
    print_hash( ht[h].r );
    tabs--;
}
void print_tree( tree *t )
{
    if(t == 0 || t->name == 0 )
        return;
    printf("0x%8.8x ", t );
    for( int x = 0; x < tabs; x++ )
        printf("  ");
    printf("%s 0x%8.8x 0x%8.8x\n",
        t->name, t->1, t->r );
    tabs++;
    print_tree( t->1 );
    print_tree( t->r );
    tabs--;
}
tree * read_tree( FILE *fd )
{
    char str[1024], *s = str;
```

-continued

```
int my_node = ntrees++;
*s = 0;
for(;;)
{
  int ch;
  do {
    ch = fgetc(fd);
  } while( isspace(ch) );
  switch( ch )
  {
    case '(':
      trees[my_node].1 = read_tree( fd );
      do {
        ch = fgetc(fd);
      } while( isspace(ch) );
      if( ch == ',' )
        trees[my_node].r = read_tree( fd );
      else
      {
        trees[my_node].r = 0;
        ungetc( ch, fd );
      }
      trees[my_node].name =
          new char[strlen(str)+1];
      strcpy( trees[my_node].name, str );
      do {
        ch = fgetc(fd);
      } while( isspace(ch) );
      if(ch != ')' )
      {
        ungetc( ch, fd );
      }
      return &trees[my_node];
    case ',':
    case ')':
      ungetc( ch, fd );
    case EOF:
      trees[my_node].1 = 0;
      trees[my_node].r = 0;
      trees[my_node].name =
          new char[strlen(str)+1];
      strcpy( trees[my_node].name, str );
      return &trees[my_node];
    default:
      *s++ = ch;
      *s = 0;
      break;
  }
 }
}
void main( void )
{
  FILE *fd = fopen( "input", "r" );
  if( fd == NULL )
    return;
  tree *t = read_tree( fd );
  printf("\nThe input tree:\n");
  print_tree( t );
  int hashed_tree = store_tree( t );
  printf("\nThe hashed tree:\n");
  print_hash( hashed_tree );
  printf("\n");
  printf("Number of input tree nodes: %d\n", ntrees );
  printf("Number of hash table nodes: %d\n", num_hashed );
}
```

What is claimed is:

1. In a development system for compiling source listings into program code executable by a digital computer, said source listings having multiply-included header files, said system including a parser for parsing said source listings and header files into a parse tree, wherein said parse tree stores items of information in nodes of the tree, wherein some of said nodes are parent nodes having children nodes, an improved method for storing parsed information, the method comprising:

(a) constructing a hash table having a number of addressable locations sufficient to store an entry for each unique item of information in a unique location; and (b) processing each node of the parse tree, said processing for each node including (b1) computing a hash address for that node, which hash address is derived by combining a value expressed by the node with hash addresses of any children nodes of that node, (b2) determining whether an entry is stored in the hash table at that hash address, and (b2i) if no entry is stored at that hash address, storing, as an entry at that hash address, a value expressed by the information item for that node and the hash addresses for any children nodes of that node, or (b2ii) if an entry is stored at that hash address, determining whether the entry that is stored at that hash address contains a value that is identical to the value expressed by the information item for that node and hash addresses that are identical to the hash addresses for any children nodes of that node, and if the entry is identical, proceeding to process the next node in the parse tree.

2. The method of claim 1, and further comprising steps, carried out if the entry is not identical, of:

repeating step (b1), to compute a different hash address; and repeating step (b2).

3. The method of claim 1, wherein said step (b) includes processing the parse tree in a traversal order wherein each parent node having children nodes is only processed after all that parent node's children nodes.

4. The method of claim 3, wherein said traversal order comprises a preorder walk of the parse tree.

5. The method of claim 3, wherein said traversal order comprises a postorder walk of the parse tree.

* * * * *